(12) United States Patent
Gammage et al.

(10) Patent No.: US 7,487,840 B2
(45) Date of Patent: Feb. 10, 2009

(54) WEAR RESISTANT LAYER FOR DOWNHOLE WELL EQUIPMENT

(75) Inventors: John Hudson Gammage, Magnolia, TX (US); Roger A. Daemen, Grignan (FR); Joe Lynn Scott, Tomball, TX (US)

(73) Assignee: Wear Sox, L.P., Houston, TX (US)

( * ) Notice: Subject to any disclaimer, the term of this patent is extended or adjusted under 35 U.S.C. 154(b) by 352 days.

(21) Appl. No.: 11/116,748

(22) Filed: Apr. 28, 2005

(65) Prior Publication Data

US 2006/0102354 A1 May 18, 2006

Related U.S. Application Data

(60) Provisional application No. 60/627,387, filed on Nov. 12, 2004.

(51) Int. Cl.
E21B 17/10 (2006.01)
E21B 41/02 (2006.01)

(52) U.S. Cl. ............... 166/380; 166/242.4; 166/902; 175/325.1; 427/451; 427/456

(58) Field of Classification Search ........... 166/380, 166/242.4, 243, 902; 175/425, 325.1; 427/449, 427/451, 452, 456
See application file for complete search history.

(56) References Cited

U.S. PATENT DOCUMENTS

| | | | |
|---|---|---|---|
| 3,012,881 A | | 12/1961 | Cape |
| 4,101,713 A | * | 7/1978 | Hirsch et al. ............... 428/554 |
| 4,473,401 A | * | 9/1984 | Masumoto et al. .......... 148/403 |
| 4,630,692 A | | 12/1986 | Ecer |
| 4,665,996 A | | 5/1987 | Foroulis et al. |
| 4,822,415 A | | 4/1989 | Dorfman et al. |
| 5,004,153 A | | 4/1991 | Sawyer |
| 5,340,615 A | | 8/1994 | Browning |
| 5,384,164 A | | 1/1995 | Browning |
| 5,652,028 A | * | 7/1997 | Taylor et al. ............... 427/451 |
| 5,932,293 A | * | 8/1999 | Belashchenko et al. ..... 427/446 |

(Continued)

OTHER PUBLICATIONS

Lampman S. R. and Reidenbach, ASM Handbook: Surface Engineering 1994, US Metals Park, ASM International, USA 5, XP002366720, *Wire arc spraying*, pp. 497-500.

(Continued)

*Primary Examiner*—Shane Bomar
(74) *Attorney, Agent, or Firm*—Locke Lord Bissell & Liddell LLP

(57) ABSTRACT

The present disclosure provides a method, system, apparatus, and related alloy to provide a protective wear coating on a downhole component for a well through a synergistic use of a thermal spraying process in combination with a novel iron-based alloy. The thermal spraying process melts the material to be deposited while a pressurized air stream sprays the molten material onto the downhole component. The coating operation takes place at low temperatures without fusion or thermal deterioration to the base material. The wear resistance is increased while providing a lower coefficient of friction by the wear resistant layer relative to a coefficient of friction of the downhole equipment without the wear resistant layer. In at least one embodiment, the disclosed process using the iron-based alloy can apply a much thicker coating than heretofore has been able to be applied without spalling and without necessitating an intermediate buffer layer.

38 Claims, 2 Drawing Sheets

U.S. PATENT DOCUMENTS

| | | | |
|---|---|---|---|
| 5,979,508 A | 11/1999 | Cherrington | |
| 6,083,330 A | 7/2000 | Moskowitz | |
| 6,199,633 B1 * | 3/2001 | Longbottom | 166/242.6 |
| 6,503,576 B1 * | 1/2003 | Russo et al. | 427/453 |
| 6,557,654 B1 | 5/2003 | Murray | |
| 6,571,472 B2 | 6/2003 | Berry et al. | |
| 6,575,350 B2 | 6/2003 | Evans et al. | |
| 6,578,539 B2 * | 6/2003 | Barbezat | 123/193.4 |
| 6,634,781 B2 * | 10/2003 | Bowens et al. | 366/79 |
| 6,649,682 B1 * | 11/2003 | Breton et al. | 524/404 |
| 7,105,205 B2 * | 9/2006 | Clayton et al. | 427/446 |
| 7,139,219 B2 * | 11/2006 | Kolle et al. | 367/85 |
| 7,216,814 B2 * | 5/2007 | Gardega | 239/85 |
| 2001/0030067 A1 | 10/2001 | Evans et al. | |
| 2003/0219544 A1 * | 11/2003 | Smith et al. | 427/446 |
| 2004/0140021 A1 | 7/2004 | Branagan | |
| 2004/0265503 A1 * | 12/2004 | Clayton et al. | 427/446 |
| 2005/0178558 A1 * | 8/2005 | Kolle et al. | 166/373 |
| 2005/0199739 A1 * | 9/2005 | Kuroda et al. | 239/13 |
| 2005/0241147 A1 * | 11/2005 | Arnold et al. | 29/889.1 |
| 2006/0062928 A1 * | 3/2006 | Lichtblau | 427/446 |
| 2006/0185908 A1 * | 8/2006 | Kembaiyan et al. | 175/425 |
| 2007/0243335 A1 * | 10/2007 | Belashchenko | 427/451 |

OTHER PUBLICATIONS

Database Compendex [Online] Engineering Information, Inc., NY, NY, US.; Anonymous: "Wear Resistant Surfaces for the Mining and Earthmoving Industries" XP002366724.

The Lund Precision Group, Plasma Transfer Arc Spray [online], retrieved from the internet on Aug. 31, 2007 using <URL: http://www.lundonline.com/id38.html>.

Pro-Fusion Technologies, Inc., The Plasma Arc Welding Process, [online], retrieved from the internet on Aug. 31, 2007 using <URL: http://www.pro-fusiononline.com/welding/plasma.htm>.

Gordon England, Arc Wire Thermal Spray Process (ArcSpray), [online], retrieved from the internet on Sep. 11, 2007 using <URL: http://www.gordonengland.co.uk/aws.htm>.

Jong-Hwan Kim, et al., High Velocity Oxyfuel Deposition for Low Surface Roughness PS304 Self-Lubricating Composite Coatings, Tribology Transactions, 47: 157-169, 2004, [online], retrieved from the internet on Sep. 11, 2007 using <URL: http://www.informaworld.com/smpp/title~content=t713669620>.

* cited by examiner

WEAR RESISTANT LAYER FOR DOWNHOLE WELL EQUIPMENT

This application claims the benefit of U.S. Provisional Application No. 60/627,387, filed Nov. 12, 2004 of the same title.

FIELD OF THE INVENTION

The invention relates to coatings applied to equipment. More specifically, the invention relates to protective wear resistant layers for downhole equipment in wells.

BACKGROUND OF THE INVENTION

Drilling wells for oil and gas recovery, as well as for other purposes, involves the use of drill pipes which, at one end, are equipped with a drilling bit whose function is to cut through various types of rock formations. The most severe abrasive wear conditions occur when drilling through highly siliceous geological earth formations. A rotational movement of the pipe ensures the progression of drilling. Pipes such as commonly used today come in sections of about 30 feet in length. These sections are connected to one another by means of tool joints. Typically these tool joints, which themselves are protected against wear by abrasion resistant overlays, have a diameter significantly larger than the body of the pipes. Under conditions of vertical drilling the tool joints protect the body of the pipes quite efficiently.

More recent technology has evolved, utilizing directional drilling, meaning the deviation of drilling from vertical to horizontal over more or less large bending radiuses of curvature. Coupled with the use of increased pipe section lengths of about 45 feet and larger diameters relative to the tool joint diameter, the fact is that the tool joints offer a lesser degree of protection of the body of the pipe and that the direct interaction of the pipe body with the walls of the well is more likely to occur. The consequence is an exposure of the pipe to wear mechanisms that may affect its integrity to a significant degree. When drilling into mineral formations, the wear mechanism involved is mainly abrasion. When drilling takes place into a steel casing or marine riser (where a marine riser connects a floating drilling or production unit to the wellhead(s) on the sea floor and through which the drill pipe passes), the wear mechanism is predominantly metal-to-metal wear with interposition of drilling fluids and drill cuttings. These wear situations are also encountered with other downhole equipments such as coiled tubing, downhole tools housing expensive instrumentation and other components exposed to longitudinal and rotational wear during well drilling operations.

One prior attempted solution was placing clamps in the middle of a drill pipe joint to keep the drill pipe away from the surface of the well bore. However, this attempted solution resulted in a catastrophic failure that led to litigation, because the clamps allegedly either separated from the pipe downhole or caused drill pipe failure. Another attempted solution was clamping rubber sleeves on the drill pipe, which also has not been successful. Further, paints, epoxy coatings, and powder metallurgy resists oxidation, but are very unsuitable for the abrasion encountered in drilling through rock. Another proposed solution was patented in U.S. Pat. No. 4,665,996 based on a particular alloy. The patent teaches essentially a welding or fusion process, either through hardsurfacing or by transfer plasma arc, respectively, for a particular material alloyed to the base material of the drill pipe to reduce wear and friction. Either process results in a metallurgical change of the base material of the drill pipe by essentially localized melting of a base material surface to add the alloy. It is believed that this concept was not successful commercially, probably due to the fact that such processes are generally avoided as welding or fusion on the drill pipe with the intense heat. Such processes may cause metallurgical changes in the base material and possible failure in the well bore that can cause the loss of millions of dollars in deeper wells. Also, the alloys referenced in this patent are expensive cobalt-based alloys that require the use of intermediate, or so-called buffer layers, of high-alloyed austenitic steels.

Further, such processes would be fatal to downhole tools having instrumentation therein, where a downhole instrumentation tool can cost up to about half a million dollars. Typically, the inside surfaces of drill pipe are coated with a corrosion resistant layer that may be damaged by the high temperatures generated during any external application by welding or fusion processes.

U.S. Pat. No. 3,012,881 ('881 patent) teaches spraying an alloy onto a part to which the alloy will not adhere or stick, and then melting the sprayed alloy while on said part. The particular alloy disclosed melts at a temperature of about 2050° F. (1120° C.). Thus, the '881 patent is similarly situated as the above '996 patent that requires higher temperatures and could cause metallurgical changes to the base material of the part and possible failure of the part downhole.

U.S. Pat. No. 4,630,692 ('692 patent) teaches a method of forming a cutter, which includes a core and a wear resistant insert defining a body means which includes (a) applying to the body means a mixture of: (i) wear resistant metallic powder, and (ii) binder (b) volatilizing the binder, (d) and applying pressure to the body means and powdered metal, at elevated temperature to consolidate same. The '692 applies the powder by dipping, painting, or spraying to temporarily hold the material to the part until the perform is heated and hot pressed at an elevated temperature in the range of 1900° to 2300° F. (1040 to 1260° C.). While the teaching may produce a wear resistant layer, it uses entirely powder metallurgy technology with associated pressing and further uses relatively high temperatures that can affect metallurgical properties of the base material.

U.S. Pat. Publication. No. 2001/0030067 ('067), teaches mounting a plurality of thermally stable polycrystalline diamond (TSP) bearing elements through welding, brazing, or adhesives, or by mechanically holding in place to form a wear resistant surface. Then, a settable facing material is applied to the part surface which bonds to the surface between the bearing elements and embraces the TSP bearing elements to hold them in place. The '067 patent teaches a method in which TSP bearing elements are secured to a component surface such as by welding or brazing part of the surface of each TSP bearing element to the component and are at least partly surrounded by a layer of less hard material. The less hard material can be flame sprayed, electrically plated, physical vapor deposited, or metal sprayed onto the surface. The wearable layer can be deposited to the height of the TSP elements, or overlayed and ground away to expose the TSPs or left to wear away during use to expose the TSPs in downhole use. Thus, this reference provides a wear resistant layer of TSPs by welding or brazing, or temporarily by adhesives or mechanically holding in place, until the wearable filler material can be deposited therebetween.

Another reference, Lampman S.R. and Reidenbach: "AMS HandbooK: Surface Engineering" 1994, US Metals Park, ASM International, USA 5, XP002366720, "Thermal Spray Coatings," pages 497-500 describes the term "thermal spray" as a generic term for a group of processes in which metallic, ceramic, cermet, and some polymeric materials in the form of powder, wire, or rod are fed to a torch or gun with which they are heated to near or somewhat above their melting point. The resulting molten or nearly molten droplets of materials are projected against the surface to be coated. Upon impact, the droplets flow into thin lamellar particles adhering to the surface, overlapping and interlocking as they solidify. The total coating thickness is usually generated in multiple passes of the coating device. The articles describes thermal spray types of flame spraying, flame spray and fuse, electric-arc (wire-arc) spray, and plasma spray. The article states that flame spray exhibits lower bond strengths, higher porosity, and a higher heat transmittal to the substrate relative to other types. The type known as flame spray and fuse is a modification of a cold spray method where parts are prepared and coated with the coating materials and then fused by heating to a temperature of 1850° to 2150° F. (1010° to 1175° C.). The articles states that fusing temperatures may alter the heat-treated properties of some alloys. The article also describes electric-arc (wire-arc) spray as a process that has no external heat source such as a gas flame or electrically induced plasma. Rather, it uses two electrically opposed charged wires, comprising the spray materials that are fed together in such a manner that a controlled arc occurs at the intersection. The molten metal on the wire tips is atomized and propelled onto a prepared substrate by a stream of compressed air or other gas. However, this article does not address known issues using this process of a peeling away of thicker layers from the base material, especially under wear conditions, for example, when the layers are 0.10 inches (2.5 millimeters) and greater. Finally, the article discusses plasma spray, in which a gas is allowed to flow between a tungsten cathode and a water-cooled copper anode. An electric arc is initiated between the two electrodes that ionizes the gas to create temperatures exceeding 54,000° F. (30,000° C.). Powder is introduced into the gas stream, heated, and accelerated toward a substrate base material for deposit thereon. The article describes coating thicknesses usually ranging from about 0.002 to 0.020 inches (0.05 to 0.50 millimeters), and further states that thicker coatings can be formed for some applications such as dimensional restoration or thermal barriers. Similarly, the article does not address known issues using this process of peeling away of thicker layers from the base material, especially under wear conditions.

Thus, there remains a need to provide a commercially effective protective wear resistant layer on downhole equipment.

SUMMARY OF THE INVENTION

The present disclosure provides a method, system, apparatus, and related alloy to provide a protective wear coating on a downhole component for a well. In at least one embodiment, the disclosure provides a synergistic use of a thermal spraying process in combination with a novel iron-based alloy. The thermal spraying process, such as twin wire arc spraying, melts the material to be deposited while a pressurized air stream sprays the molten material onto the downhole component. The coating operation takes place at low temperatures without fusion to the base material. Thus, there is no thermal deterioration of the base material, whose underlying properties remain unaffected. Coatings can be applied over small or large surfaces. The wear resistance is increased while providing a lower coefficient of friction by the wear resistant layer relative to a coefficient of friction of the downhole equipment without the wear resistant layer. In at least one embodiment, the disclosed process using the iron-based alloy can apply a much thicker coating than heretofore has been able to be applied without spalling and without necessitating an intermediate buffer layer.

BRIEF DESCRIPTION OF THE DRAWINGS

A more particular description of the invention, briefly summarized above, can be realized by reference to the embodiments thereof that are illustrated in the appended drawings and described herein. However, it is to be noted that the appended drawings illustrate only some embodiments of the invention. Therefore, the drawings are not to be considered limiting of its scope, for the invention may admit to other equally effective embodiments.

DETAILED DESCRIPTION OF THE INVENTION

Figure 1:
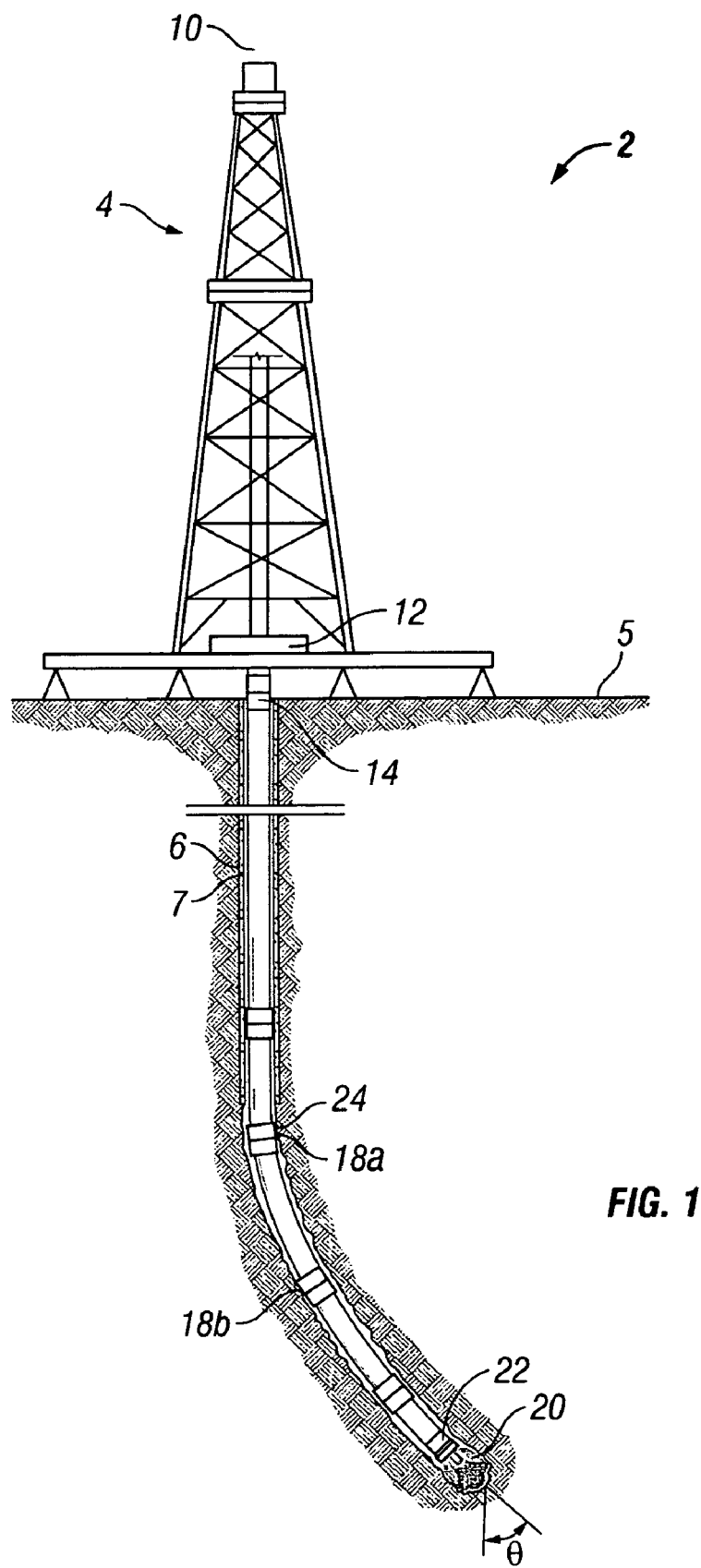
FIG. 1 is a cross-sectional schematic diagram of a drilling rig with an associated downhole assembly in a well bore.

FIG. 1 is a cross-sectional schematic diagram of a drilling rig with an associated downhole assembly in a well bore. A well 2 is generally formed or serviced with a rig 4. The rig is stationed above the well location generally on a surface 5, such a ground surface, a seabed floor, or on a fixed or floating platform. The rig can be a drilling rig, a workover rig, or a service rig, or other rigs, depending on the operation desired. The well 2 includes a wellbore 6 that is generally lined with a casing 7. The casing 7 is generally a steel tubular member. A conduit 10 is used to form or service the well 2. The conduit can be a drilling pipe, coiled tubing, or other tubular goods of various sizes and cross sectional shapes. If the conduit 10 is jointed, a coupling 14 can be used to couple the joints of the conduit together. The term "coupled," "coupling," and like terms are used broadly herein and can include any method or device for securing, binding, bonding, fastening, attaching, joining, inserting therein, forming thereon or therein, communicating, or otherwise associating, for example, mechanically, fluidicly, magnetically, electrically, chemically, directly or indirectly with intermediate elements, one or more pieces of members together and can further include integrally forming one functional member with another. The coupling can occur in any direction, including rotationally.

An end tool 20, such as a drill bit, motor, sensor, or other tool, can be disposed on the leading end of the conduit 10. Further, one or more inline tools 22, such as motors, sensors, valves, and other components that can be coupled to the conduit 10, can be disposed along various portions of the conduit 10 before the end tool 20. The conduit 10, tools 20, 22, and other equipment that can be disposed temporarily or permanently disposed downhole in a well (generally termed "downhole components" herein) can suffer from longitudinal and rotational wear. The various downhole components of one or more joints (if segmented drill pipe is used), one or more tools, and other components can form a "drill string" to drill the well.

Further, the well may be directed at various angles θ to the vertical line from the surface 5, through for example directional drilling. One or more wear areas 18a, 18b can be formed at the various changes in direction. These wear areas can degrade the conduit 10, the casing 7, downhole components 14, 20, 22, and other components from rotational and/or longitudinal movement.

The present invention can be used with a variety of components having longitudinal and/or especially rotational movement seeking wear resistance from abrasion. A wear resistant layer 24 according to the present invention can be included with the conduit 10, tools 20, 22, and other downhole components. Advantageously and in contrast to prior efforts, the wear resistant layer is coupled to the surface of the conduit 10 or tools 20, 22 without causing significant metallurgical effects on the base material of the component. Further, the present disclosure does not raise the temperature of the base material sufficiently to cause thermal damage to typical internal coatings, for example, on instrumentation and other downhole components. Thus, the present invention answers the concerns and satisfies the remaining need caused by the hardsurfacing and fusion prior efforts that did metallurgically affect the base material or otherwise limit the application. Yet, the present invention provides a far superior wear surface compared to other types of applied coatings, such as-paint, epoxy coating, and powder coatings.

Figure 2:
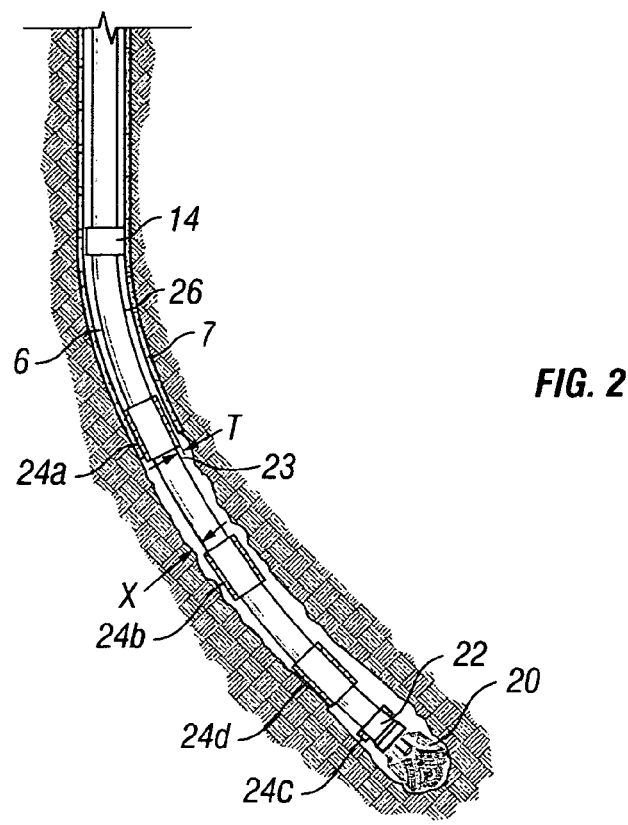
FIG. 2 is a cross-sectional schematic diagram of a downhole assembly with one or more wear resistant layers.

FIG. 2 is a cross-sectional schematic diagram of a downhole assembly with one or more wear resistant layers. Similar elements are numbered similarly as in FIG. 1. The conduit 10 and tools 20, 22 can include one or more wear resistant layers, generally referred to herein as wear resistant layer 24 deposited on the base material 23, that is original material, of the downhole component. For example, conduit 10 can include one or more wear resistant layers 24a, 24b, 24d, and the tools 20 and/or 22 can includes a wear resistant layer 24c. The wear resistant layer 24 can be one or more bands on the surface of the downhole components. The wear resistant layer 24 can also be applied along substantially the entire length of the downhole component that is to be protected.

Besides depositing such a wear resistant layer without significantly affecting the metallurgical properties of the base material, the thickness of the wear resistant layer can affect the ultimate efficacy of the wear resistant layer. A relatively thin layer (0.015" to 0.020") that has been used in other fields for corrosion control may not be sufficient to withstand the abrasive conditions desired of downhole components.

A thicker wear resistant layer can physically distance uncoated portions of base material by distance X away from the abrasive surface of the wellbore 6 or casing 7, as well as provide sufficient thickness to practically reduce the wear on downhole components. Prior to the present invention, however, such thicknesses were not available by a process that would not metallurgically affect the base material. Thicker layers typically have in the past slipped off or peeled away from the base material when using processes that did not metallurgically affect the base material. Hardsurfacing and fusion could deposit the desired thickness, but caused the undesirable metallurgical effects on the base material.

In at least one embodiment, the disclosure provides a deposition process to form a wear resistant layer suitable for the rigorous conditions encountered by downhole components, but yet does not materially change the underlying base material. Further, the particular material can be used to form a relatively thick layer of thickness "T" of 0.10" or more, advantageously up to about 0.35", and generally less than 0.50", although the range can vary while maintaining the bonding between the wear resistant layer and the base material. Prior to the present invention, such a thick layer was unsuitable for downhole tools. Any other layer provided by a prior known process that did not metallurgically affect the base material would slip off or peel away from the base material, especially during abrasive conditions.

Several types of thermal spraying for applying thin layers in other fields of endeavor are available and the present invention contemplates any of a variety of thermal spray techniques to apply the wear resistant layer 24.

Figure 3:
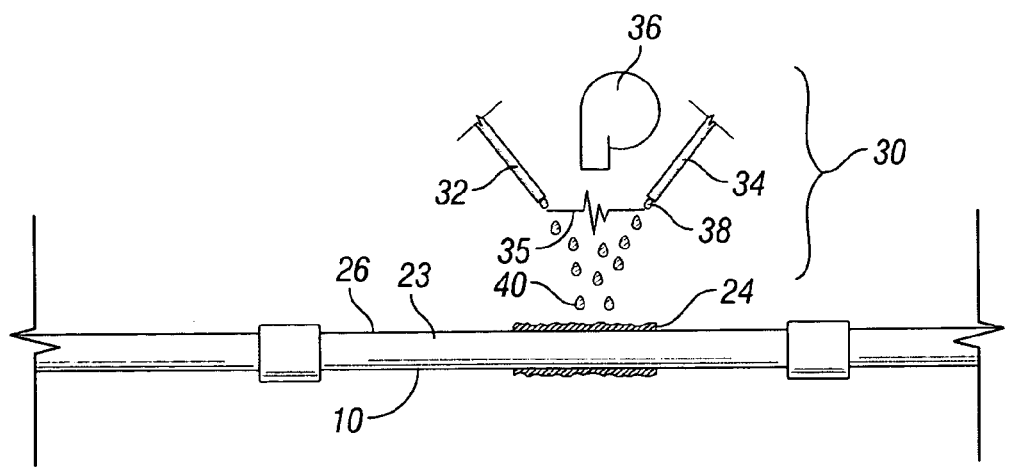
FIG. 3 is a schematic diagram of a thermal spray system applying a wear resistant layer to a downhole component.

FIG. 3 is a schematic diagram of an exemplary thermal spray system for applying a wear resistant layer to a downhole component, according to the present invention. One type of thermal spraying system 30 that is advantageously used is a twin wire system. The twin wire system uses a first wire 32 and a second wire 34. In at least one embodiment, the first wire 32 and the second wire 34 generally are of the same nature, whether solid or tubular, and the same diameter, but not necessarily of the same chemical composition. For example, the first wire 32 could be of a first composition, while the second wire 34 could of the same or a complementary composition to the first composition to yield a desired wear resistant layer on the base material.

A voltage is applied to the wires. The proximity of the wire ends creates an arc 35 between the ends and cause the wires to melt. A high-pressure compressed air source 36 atomizes molten metal 38 caused by the arcing into fine droplets 40 and propels them at high velocity toward the downhole component, such as conduit 10 or other components, to being deposited on the external surface 26. The twin wire spraying process can use commercially available equipment, such as torches, wire feeding systems and power sources. Other thermal spraying processes are available and the above is only exemplary as the present invention contemplates thermal spraying processes in general for this particular invention.

As mentioned above, the present invention encompasses applying a uniquely thick thermally sprayed wear resistant layer by an order of magnitude greater than previous applications of thermal spraying than in even different fields. To apply such a thick layer, the present invention uses a unique material that resists spalling or otherwise peeling off. The material can be made into a structure convenient for thermal spraying machinery, such as wire or other appropriate shapes. In at least one embodiment, the material includes uniquely formulated tubular wires that, when deposited by the twin wire thermal spray process, result in the formation of a coating alloy whose structure is made up of a carbon/boron/chromium steel matrix containing precipitates of both chromium carbides and borides, and can include additional alloying elements acting as matrix strengtheners, such as nickel, molybdenum, tungsten, and titanium.

In at least one embodiment, the composition of the material determined by analysis prior to thermal spraying onto a downhole component can include the following iron-containing composition comprising:

C: from about 0.40 to about 2.5 weight percent;
Cr: from about 4.0 to about 35 weight percent;
B: from about 3.5 to about 10.0 weight percent;
Ni: from about 0.0 to about 2.0 weight percent;
Nb: from about 0.0 to about 2.5 weight percent;
Mn: from about 1.0 to about 3.5 weight percent;
Si: from about 0.0 to about 2.5 weight percent;
Ti: from about 0.0 to about 2.0 weight percent;
V: from about 0.0 to about 2.0 weight percent; and
W: from about 0.0 to about 2.5 weight percent.

Iron (Fe) is the principal remaining element. A zero percent for the lower range of an element indicates a percentage where no intended addition of the element would be present, although some trace amounts may be detected. These compositional ranges cover alloys whose microstructures are of the following types:

Martensitic plus a relatively high density of carbides and borides.

Hyper-eutectic carbides or borides in a eutectic matrix.

It is believed that many alloys having compositions falling outside the above specified ranges may show microstructures with excessive amounts of residual austenite or even show fully austenitic plus carbide-boride structures. Such latter structures are disadvantageous and are much more sensitive to disbonding from the base material upon which the wear resistant layer is formed and/or within the wear resistant layer itself. Further such alloys falling outside the above ranges appear to be characterized by a significantly lower abrasion resistance.

An advantageous embodiment having a medium alloyed content within the general ranges stated above, comprises:
C: from about 0.6 to about 0.7 weight percent;
Cr: from about 5.0 to about 6.0 weight percent;
B: from about 4.3 to about 5.0 weight percent;
Ni: from about 1.65 to about 1.85 weight percent;
Nb: from about 0.10 to about 0.25 weight percent;
Mn: from about 2.0 to about 2.5 weight percent;
Si: from about 0.4 to about 0.6 weight percent;
Ti: from about 1.0 to about 1.35 weight percent;
V: from about 1.15 to about 1.35 weight percent; and
W: from about 0.10 to about 1.0 weight percent.

An advantageous embodiment having a higher alloyed content within the general ranges stated above, comprises:
C: from about 1.5 to about 2.5 weight percent;
Cr: from about 20.0 to about 25.0 weight percent;
B: from about 5.0 to about 8.5 weight percent;
Ni: from about 0.0 to about 2.0 weight percent;
Nb: from about 0.0 to about 1.0 weight percent;
Mn: from about 1.0 to about 1.5 weight percent;
Si: from about 0.85 to about 2.5 weight percent;
Ti: from about 0.0 to about 1.0 weight percent;
V: from about 0.0 to about 1.0 weight percent; and
W: from about 0.0 to about 2.0 weight percent.

Further, the disclosed coating generally provides a lower coefficient of friction than the coefficient of friction of the steel of the downhole component, such as drill pipe. A lower downhole coefficient of friction translates into lower longitudinal and rotational forces along the length of the conduit and ultimately the forces imposed on the drilling rig itself. Longitudinal and rotational forces are proportional to the load on the "drill string" multiplied by the coefficient of friction. The required surface power generally is a product of the force multiplied by the speed of the item to be driven, whether longitudinally by pulling or pushing, rotationally, or a combination thereof. Thus, lower surface forces translate into lower rig power requirements (herein "driving force") for moving the downhole components longitudinally and rotationally. This lower power requirement may in turn result in lower rig fuel consumption, a smaller drilling unit, and/or may extend a given rig's pulling/pushing and rotational capability. Further, the coating results in less damage to the well casing and the downhole component.

The coating is generally repairable. The downhole component can be repeatedly recoated with the thermal coating process and the material disclosed herein. This ability is in stark contrast to earlier efforts that were limited due to the inherent change in the base material from high heat and fusion.

Still further, the material as deposited creates a coating that if a piece of it should break off, the piece is readily crushable in the drilling operation. It should not pose a risk of perforating the casing wall or otherwise damaging other downhole components.

While the foregoing is directed to various embodiments of the present invention, other and further embodiments may be devised without departing from the basic scope thereof. Other embodiments within the scope of the claims herein will be apparent to one skilled in the art from consideration of the specification and practice of the invention as disclosed herein. For example, various materials can be used in some embodiments with a thermal spraying system, and the material of the present invention described herein can be applied by a non-welding or non-fusion process to downhole tools and yet remain fixedly attached to the downhole tools. Further, different thermal spraying systems can be used to apply a wear resistant layer without metallurgically affecting the base material. The chemical ranges of the exemplary advantageous embodiments can be altered to values between each other and/or to values within the general ranges disclosed herein and conversely, the general ranges can be altered to include the lower and upper values of the exemplary advantageous embodiments, as would be known and customary in the art. It is intended that the specification, together with the example, be considered exemplary only, with the scope and spirit of the invention being indicated by the claims that follow.

The various methods and embodiments of the invention can be included in combination with each other to produce variations of the disclosed methods and embodiments, as would be understood by those with ordinary skill in the art, given the understanding provided herein. Also, various aspects of the embodiments could be used in conjunction with each other to accomplish the understood goals of the invention. Also, the directions such as "top," "bottom," "left," "right," "upper," "lower," and other directions and orientations are described herein for clarity in reference to the figures and are not to be limiting of the actual device or system or use of the device or system. Unless the context requires otherwise, the word "comprise" or variations such as "comprises" or "comprising", should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. Further, the order of steps can occur in a variety of sequences unless otherwise specifically limited. The various steps described herein can be combined with other steps, interlineated with the stated steps, and/or split into multiple steps. Additionally, the headings herein are for the convenience of the reader and are not intended to limit the scope of the invention.

Further, any references mentioned in the application for this patent as well as all references listed in the information disclosure originally filed with the application are hereby incorporated by reference in their entirety to the extent such may be deemed essential to support the enabling of the invention. However, to the extent statements might be considered inconsistent with the patenting of the invention, such statements are expressly not meant to be considered as made by the Applicants.

The invention claimed is:

1. A process for applying a wear resistant layer to a downhole component for inserting into a well, comprising:
thermal spraying the wear resistant layer onto at least a portion of an external surface of the downhole component, the wear resistant layer being formed of an iron-containing material having a composition prior to thermal spraying consisting essentially of:
C: from about 0.40 to about 2.5 weight percent;
Cr: from about 4.0 to about 35 weight percent;
B: from about 3.5 to about 10.0 weight percent;
Ni: from about 0.0 to about 2.0 weight percent;
Nb: from about 0.0 to about 2.5 weight percent;

Mn: from about 1.0 to about 3.5 weight percent;
Si: from about 0.0 to about 2.5 weight percent;
Ti: from about 0.0 to about 2.0 weight percent;
V: from about 1.15 to about 2.0 weight percent; and
W: from about 0.0 to about 2.5 weight percent;
with iron (Fe) being a principal remaining element of the composition.

2. The process of claim 1, wherein thermal spraying comprises using a twin wire thermal spraying process.

3. The process of claim 2, wherein the twin wire thermal spraying process uses a first wire and a second wire comprising the same material.

4. The process of claim 2, wherein one wire comprises a first material having a first portion of the material from claim 1 and a second wire comprises a second material complementary to the first material that when thermal sprayed together with the first material produces the wear resistant layer.

5. The process of claim 1, wherein the iron-containing material prior to thermal spraying comprises:
C: from about 0.6 to about 0.7 weight percent;
Cr: from about 5.0 to about 6.0 weight percent;
B: from about 4.3 to about 5.0 weight percent;
Ni: from about 1.65 to about 1.85 weight percent;
Nb: from about 0.10 to about 0.25 weight percent;
Mn: from about 2.0 to about 2.5 weight percent;
Si: from about 0.4 to about 0.6 weight percent;
Ti: from about 1.0 to about 1.35 weight percent;
V: from about 1.15 to about 1.35 weight percent; and
W: from about 0.10 to about 1.0 weight percent.

6. The process of claim 1, wherein the iron-containing material prior to thermal spraying comprises:
C: from about 1.5 to about 2.5 weight percent;
Cr: from about 20.0 to about 25.0 weight percent;
B: from about 5.0 to about 8.5 weight percent;
Ni: from about 0.0 to about 2.0 weight percent;
Nb: from about 0.0 to about 1.0 weight percent;
Mn: from about 1.0 to about 1.5 weight percent;
Si: from about 0.85 to about 2.5 weight percent;
Ti: from about 0.0 to about 1.0 weight percent;
V: from about 1.15 to about 1.35 weight percent; and
W: from about 0.0 to about 2.0 weight percent.

7. The process of claim 1, further comprising increasing a wear resistance of the downhole component with the wear resistant layer relative to a wear resistance of the downhole component without the wear resistant layer.

8. The process of claim 7, wherein the wear resistance is increased while providing a lower coefficient of friction of the wear resistant layer relative to a coefficient of friction of the downhole component without the wear resistant layer.

9. The process of claim 8, further comprising causing a lower driving force from a rig moving the downhole component in the well from the wear resistant layer relative to a driving force caused without the wear resistant layer.

10. The process of claim 1, wherein the thermal spraying applies the wear resistant layer independent of metallurgical changes to the downhole component.

11. The process of claim 1, further comprising thermal spraying a plurality of downhole components to form at least a portion of a drill string.

12. The process of claim 1, further comprising thermal spraying the wear resistant layer at least 0.10 inches (2.5 millimeters) thick onto the downhole component while maintaining bonding with a base material of the downhole component.

13. A thermal spray system used to apply the wear resistant layer of claim 1, the thermal spray system having a thermal spray material with the composition of the iron-containing material of claim 1.

14. The process of claim 1, wherein the thermal spraying comprises spraying with a twin wire thermal spray system the wear resistant layer without causing metallurgical changes to a base material of the downhole component.

15. The process of claim 1, wherein the downhole component comprises a component designed to rotate in operation in a downhole location.

16. A process for applying a wear resistant layer to a downhole component for a well, comprising:
  a. obtaining a downhole component adapted to be inserted into the well;
  b. thermal spraying a wear resistant layer of a principally iron-based material onto at least a portion of an external surface of the downhole component independent of metallurgical changes to a base material of the downhole component to cause deposition of the wear resistant layer having a thickness of at least 0.10 inches (2.5 millimeters) and the layer being adapted by the thermal spraying to maintain bonding with the base material of the downhole component when used downhole.

17. The process of claim 16, wherein the wear resistant layer is formed of an iron-containing material having a composition prior to thermal spraying comprising:
C: from about 0.40 to about 2.5 weight percent;
Cr: from about 4.0 to about 35 weight percent;
B: from about 3.5 to about 10.0 weight percent;
Ni: from about 0.0 to about 2.0 weight percent;
Nb: from about 0.0 to about 2.5 weight percent;
Mn: from about 1.0 to about 3.5 weight percent;
Si: from about 0.0 to about 2.5 weight percent;
Ti: from about 0.0 to about 2.0 weight percent;
V: from about 0.0 to about 2.0 weight percent; and
W: from about 0.0 to about 2.5 weight percent.

18. The process of claim 16, wherein the wear resistant layer is formed of an iron-containing material having a composition prior to thermal spraying comprising:
C: from about 0.6 to about 0.7 weight percent;
Cr: from about 5.0 to about 6.0 weight percent;
B: from about 4.3 to about 5.0 weight percent;
Ni: from about 1.65 to about 1.85 weight percent;
Nb: from about 0.10 to about 0.25 weight percent;
Mn: from about 2.0 to about 2.5 weight percent;
Si: from about 0.4 to about 0.6 weight percent;
Ti: from about 1.0 to about 1.35 weight percent;
V: from about 1.15 to about 1.35 weight percent; and
W: from about 0.10 to about 1.0 weight percent.

19. The process of claim 16, wherein the wear resistant layer is formed of an iron-containing material having a composition prior to thermal spraying comprising:
C: from about 1.5 to about 2.5 weight percent;
Cr: from about 20.0 to about 25.0 weight percent;
B: from about 5.0 to about 8.5 weight percent;
Ni: from about 0.0 to about 2.0 weight percent;
Nb: from about 0.0 to about 1.0 weight percent;
Mn: from about 1.0 to about 1.5 weight percent;
Si: from about 0.85 to about 2.5 weight percent;
Ti: from about 0.0 to about 1.0 weight percent;
V: from about 0.0 to about 1.0 weight percent; and
W: from about 0.0 to about 2.0 weight percent.

20. The process of claim 16, further comprising using a twin wire thermal spraying process, wherein one wire comprises a first material and a second wire comprises a second material complementary to the first material that when thermal sprayed together with the first material produces the wear resistant layer.

21. The process of claim 16, further comprising thermal spraying a wear band proximate to the middle of a drill pipe joint.

22. The process of claim 16, wherein thermal spraying applies the wear resistant layer to the downhole component independent of metallurgical changes to the downhole component.

23. The process of claim 16, further comprising increasing a wear resistance of the downhole component with the wear resistant layer relative to a wear resistance of the downhole component without the wear resistant layer, while providing a lower coefficient of friction of the wear resistant layer relative to a coefficient of friction of the downhole component without the wear resistant layer.

24. A modified downhole component, comprising:
   a. a downhole component adapted to be inserted into the well;
   b. a wear resistant layer of a principally iron-based material that is thermal sprayed on at least a portion of an external surface of the downhole component independent of metallurgical changes to a base material of the downhole component to cause deposition of the wear resistant layer having a thickness of at least 0.10 inches (2.5 millimeters) and the layer being adapted by the thermal spraying to maintain bonding with the base material of the downhole component when used downhole.

25. The downhole component of claim 24, wherein the wear resistant layer is formed by a twin wire thermal spray process, wherein one wire comprises a first material and a second wire comprises a second material complementary to the first material that when thermal sprayed together with the first material produces the wear resistant layer.

26. The downhole component of claim 24, wherein the wear resistant layer is coupled to the external surface of the downhole component independent of metallurgical changes to the downhole component.

27. The downhole component of claim 24, wherein the wear resistant layer has greater wear resistance than the downhole component without the wear resistant layer, and has a lower coefficient of friction than a coefficient of friction of the downhole component without the wear resistant layer.

28. The downhole component of claim 27, wherein the wear resistant layer causes a lower driving force from a rig moving the downhole component in the well relative to a driving force caused without the wear resistant layer.

29. The downhole component of claim 24, wherein the wear resistant layer is formed of an iron-containing material having a composition prior to thermal spraying comprising:
   C: from about 0.40 to about 2.5 weight percent;
   Cr: from about 4.0 to about 35 weight percent;
   B: from about 3.5 to about 10.0 weight percent;
   Ni: from about 0.0 to about 2.0 weight percent;
   Nb: from about 0.0 to about 2.5 weight percent;
   Mn: from about 1.0 to about 3.5 weight percent;
   Si: from about 0.0 to about 2.5 weight percent;
   Ti: from about 0.0 to about 2.0 weight percent;
   V: from about 0.0 to about 2.0 weight percent; and
   W: from about 0.0 to about 2.5 weight percent.

30. The downhole component of claim 29, wherein the wear resistant layer is formed by a twin wire thermal spray process, wherein one wire comprises a first material and a second wire comprises a second material complementary to the first material that when thermal sprayed together with the first material produces the wear resistant layer.

31. A wear resistant layer formed by thermal spraying on a component, the wear resistant layer being formed of an iron-containing material having a composition prior to thermal spraying consisting essentially of:
   C: from about 0.40 to about 2.5 weight percent;
   Cr: from about 4.0 to about 35 weight percent;
   B: from about 3.5 to about 10.0 weight percent;
   Ni: from about 0.0 to about 2.0 weight percent;
   Nb: from about 0.0 to about 2.5 weight percent;
   Mn: from about 1.0 to about 3.5 weight percent;
   Si: from about 0.0 to about 2.5 weight percent;
   Ti: from about 0.0 to about 2.0 weight percent;
   V: from about 1.15 to about 2.0 weight percent; and
   W: from about 0.0 to about 2.5 weight percent;
   with iron (Fe) being a principal remaining element of the composition.

32. The wear resistant layer of claim 31, wherein the layer is formed from a twin wire thermal spraying process.

33. The wear resistant layer of claim 31, wherein the wear resistant layer is deposited on the component independent of metallurgical changes to the component.

34. The wear resistant layer of claim 33, wherein the wear resistant layer comprises a thickness at least 0.10 inches (2.5 millimeters) on the component.

35. The wear resistant layer of claim 31, wherein the wear resistant layer has greater wear resistance than a component without the wear resistant layer, and has a lower coefficient of friction than a coefficient of friction of a component without the wear resistant layer.

36. A thermal spray system used to apply the wear resistant layer of claim 31, the thermal spray system having a thermal spray material with the composition of the iron-containing material of claim 31.

37. The wear resistant layer of claim 31, wherein the iron-containing material prior to thermal spraying comprises:
   C: from about 0.6 to about 0.7 weight percent;
   Cr: from about 5.0 to about 6.0 weight percent;
   B: from about 4.3 to about 5.0 weight percent;
   Ni: from about 1.65 to about 1.85 weight percent;
   Nb: from about 0.10 to about 0.25 weight percent;
   Mn: from about 2.0 to about 2.5 weight percent;
   Si: from about 0.4 to about 0.6 weight percent;
   Ti: from about 1.0 to about 1.35 weight percent;
   V: from about 1.15 to about 1.35 weight percent; and
   W: from about 0.10 to about 1.0 weight percent.

38. The wear resistant layer of claim 31, wherein the iron-containing material prior to thermal spraying comprises:
   C: from about 1.5 to about 2.5 weight percent;
   Cr: from about 20.0 to about 25.0 weight percent;
   B: from about 5.0 to about 8.5 weight percent;
   Ni: from about 0.0 to about 2.0 weight percent;
   Nb: from about 0.0 to about 1.0 weight percent;
   Mn: from about 1.0 to about 1.5 weight percent;
   Si: from about 0.85 to about 2.5 weight percent;
   Ti: from about 0.0 to about 1.0 weight percent;
   V: from about 1.15 to about 1.35 weight percent; and
   W: from about 0.0 to about 2.0 weight percent.

* * * * *